United States Patent [19]
McJunkin

[11] 3,762,764
[45] Oct. 2, 1973

[54] FOLDING SEAT FOR TRANSPORTATION TYPE VEHICLE

[75] Inventor: James G. McJunkin, Chula Vista, Calif.

[73] Assignee: Rohr Industries, Inc., Chula Vista, Calif.

[22] Filed: Feb. 22, 1972

[21] Appl. No.: 227,783

[52] U.S. Cl. ................. 297/14, 297/92, 297/331, 296/63, 296/69
[51] Int. Cl. ............................................ B60n 1/02
[58] Field of Search .................. 297/14, 1, 3, 93, 297/92, 243, 244, 331, 332, 335, 336

[56] References Cited
UNITED STATES PATENTS

| 1,617,901 | 2/1927 | Freise | 297/14 |
| 1,465,529 | 8/1923 | Rumbaugh | 297/14 |
| 3,594,037 | 7/1971 | Sherman | 297/14 |
| 1,167,831 | 1/1916 | Kilburn | 297/244 |
| 2,572,435 | 10/1951 | White | 297/1 |

FOREIGN PATENTS OR APPLICATIONS
2,845  0/1886  Great Britain ..................... 297/92

Primary Examiner—Francis K. Zugel
Attorney—George E. Pearson

[57] ABSTRACT

A folding seat, which becomes a semi-seat when folded, comprises a generally upright back member supported on a vehicle wall or floor, or both. Each back member has a recess in the lower portion thereof, and a folding seat member, having a projection on its under side, is hingedly mounted in the lower end of each recess. Each seat member swings between lowered, full seating position, and upswung, folded, semi-seating position. A lower back support member is carried by each seat member and rides within its associated back recess. When the seat member is swung down to full seating position the lower back support member associated therewith is moved thereby to close the recess flush with the back portion above the recess. Spring biasing means preferably urges each seat member toward folded position, or at least provides a counterbalancing effect.

7 Claims, 8 Drawing Figures

PATENTED OCT 2 1973

FOLDING SEAT FOR TRANSPORTATION TYPE VEHICLE

BACKGROUND OF THE INVENTION

In transportation type vehicles, such as buses and cars for mass transportation systems, it is desirable to provide full seating accommodations for all possible passengers, together with stowage space for their hand luggage. At times, however, it may be necessary to accommodate more passengers then there are seats avialable, and also to accommodate exta luggage, or even express or freight cargo. Other uses also may be found for a folding seat which, even when folded, provides a support for a passenger in semi-seated position, while at the same time increasing the floor space available for standees or additional luggage. Such a seat also may be useful, for example, in airplanes, where it would have obvious advantages for cabin attendants as discussed in U. S. Pat. No. 3,594,037.

SUMMARY OF THE INVENTION

A primary objective of the present invention is to provide a folding seat for use in a transportation type vehicle, wherein an upright back portion, recessed at its lower end, has a seat member hingedly mounted in the lower end of the recess to swing from a lowered, full seating position, wherein it extends substantially horizontally from the lower end of the recess, to upright, folded position housed in the recess. A lower back support member carried by the seat fits flush with the recess when the seat is in lowered, full seating position, and an extension from what is the under side of the seat member when the latter is in its full seating position, extends outwardly when the seat member is swung upwardly into the recess and provides a semi-seat to support at least part of the body weight of a user.

BRIEF DESCRIPTION OF THE DRAWINGS

The foregoing objectives and advantages of the invention will be apparent from the following description and the accompanying drawings, wherein.

DETAILED DESCRIPTION OF THE DRAWINGS

Figure 1:
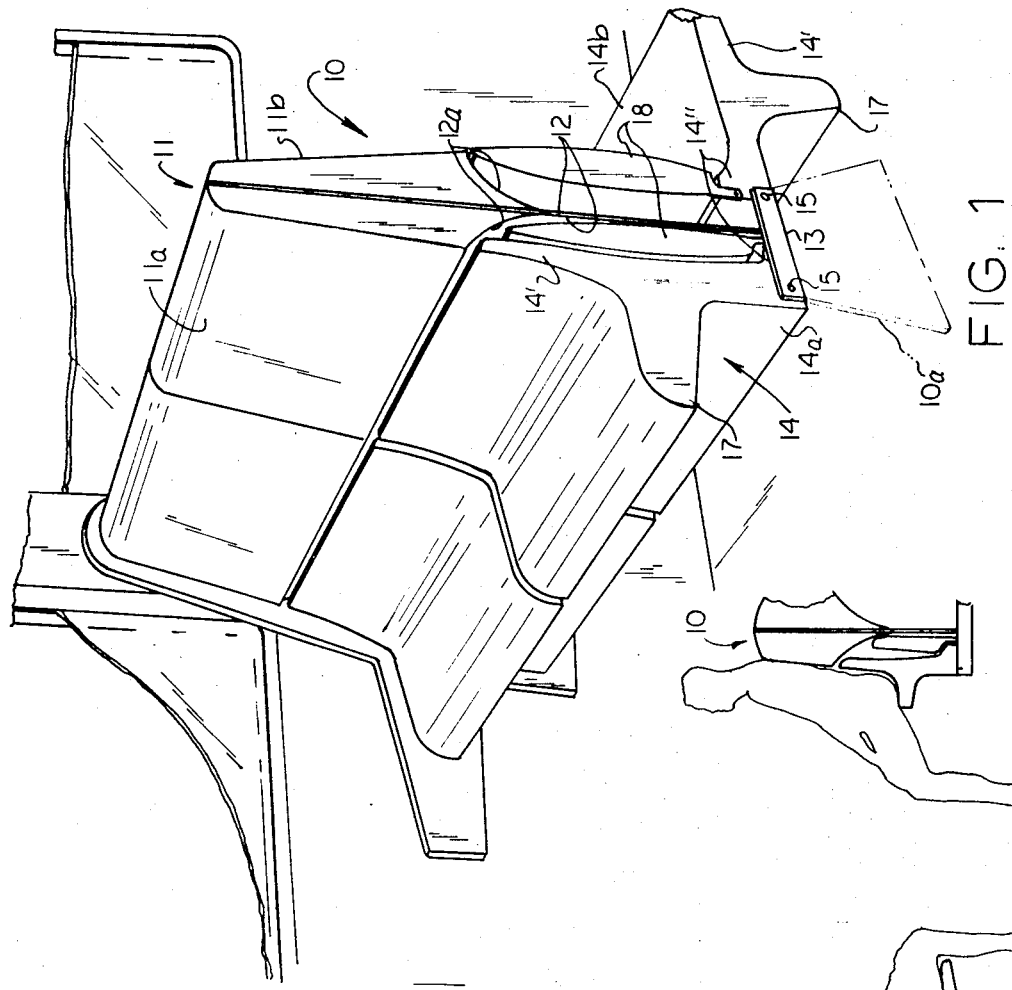
FIG. 1 is a fragmentary, perspective view showing a portion of the interior of a transportation type vehicle, such as a bus, train or airplane, with a double seat embodying the invention installed therein.
Figure 2B:
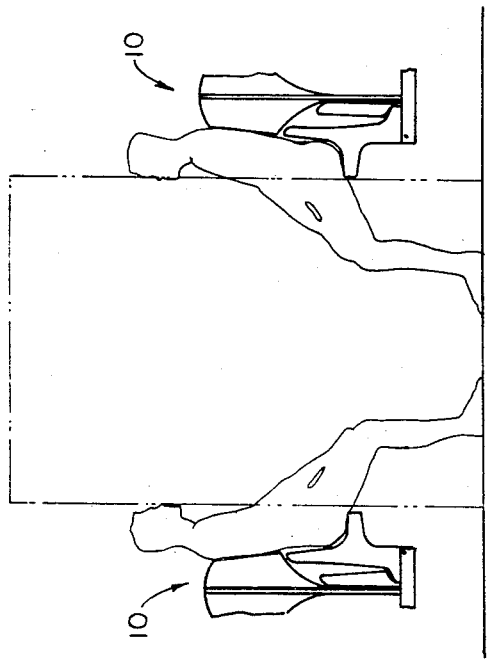
FIG. 2B is a continuation of the left hand end of FIG. 2A, the broken line outline indicating the space available for cargo between the seats when the latter are folded and unoccupied.
Figure 2A:
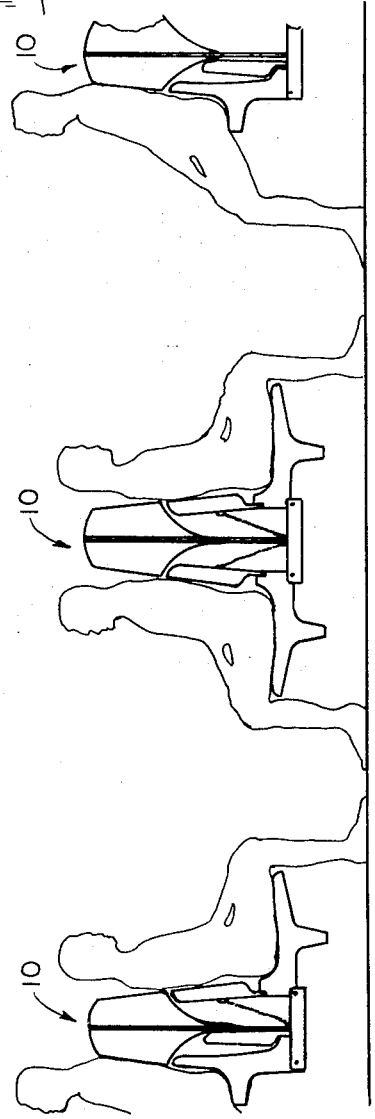
FIG. 2A is a diagrammatic view in the nature of a vertical longitudinal sectional view through the vehicle showing several of the double seats in various conditions of occupancy.
Figure 3:
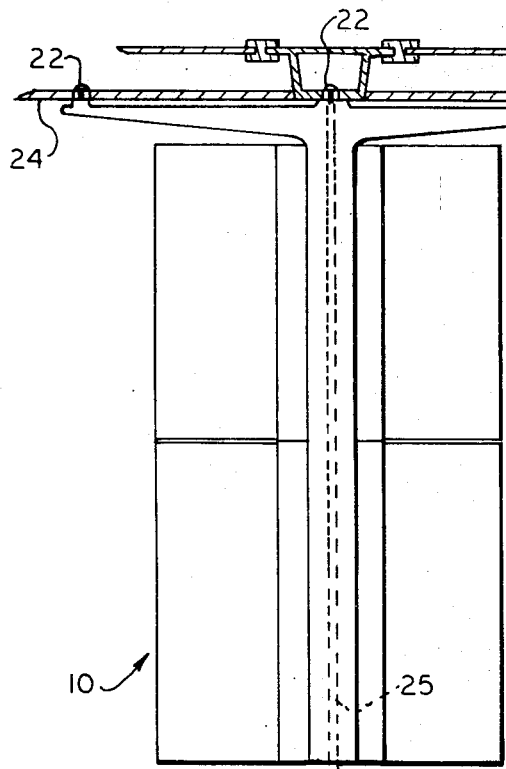
FIG. 3 is a horizontal sectional view through the vehicle wall and a top, plan view of the double seat shown in FIG. 1.
Figure 7:
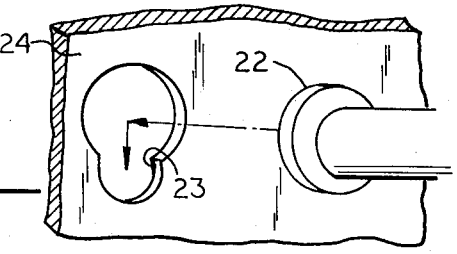
FIG. 7 is an enlarged fragmentary perspective view of a seat mounting arrangement.

Referring to the drawings in detail, a double seat 10, see FIGS. 1-3, comprises a fixed back member 11, which is illustrated as having two identical half portions 11a and 11b connected integrally together in back-to-back relation, each back half portion having a recess 12 extending across the lower end thereof. The seat 10 may be mounted to a sidewall of the vehicle in which it is to be used by headed studs 22, see FIG. 7, fitted into conventional keyhole slots 23 in the vehicle wall 24 so that the seats may be removed completely from the vehicle in the event that it is to be used for hauling baggage or freight. The seat 10 is shown in solid lines in FIG. 1 as having full cantilever support from the wall, but a floor support 10a shown in broken lines in the same figure, may be provided if desired.

A seat member mounting bracket 13 is securely mounted to the back member 11 at the lower end of the recess 12, and a folding seat member 14 is hingedly mounted on a pintle 15 provided at the free end of the bracket. Each seat member 14 swings about its pintle 15 as an axis between upswung, or folded position as shown by the left hand seat member 14a in FIG. 1, and in FIG. 4, and downswung or full seating position as shown by the right hand seat member 14b of FIG. 1, and in FIG. 5. Each seat member 14 is basically of modified L-shape, having a long leg portion 14 which acts as the seat when in full seated position and a short leg portion 14'' which provides moving support for a lower back support member 18 to be described later herein. A projection 17 is provided on what is the lower side of each long leg portion 14' of each seat member 14 when the latter is in its downswung or full seating position.

The lower back support member 18, for supporting the lower portion of one's back when in full seated position on the seat, is hingedly mounted on the free end of the short leg portion 14'' of each seat member 14, and moves edgewise within its respective recess 12 from a lowered position, concealed behind, and substantially parallel to its associated seat position 14 when the latter is in its upswung or folded position; to an exposed position substantially flush with the seat back member 11 above the recess 12 therein when the seat member 14 is swung downwardly to its full seating position. Moving of the upper end of the lower back support member outwardly to a position flush with the upper back member is accomplished by a curved cam surface 12a provided at the upper end of each recess 12. Suitable spring means, illustrated as comprising a coil spring 19 mounted in tension between the lower back support member 18 downwardly and into its recess 12, and thereby urges its associated seat member 14 toward folded position. The strength of this spring may be selected as required to provide either (1) a mild downwardly biasing effect on the lower back support member 18 for counterbalancing the weight of the seat member 14, or (2) a stronger, positive folding bias on the seat member.

Figure 4:
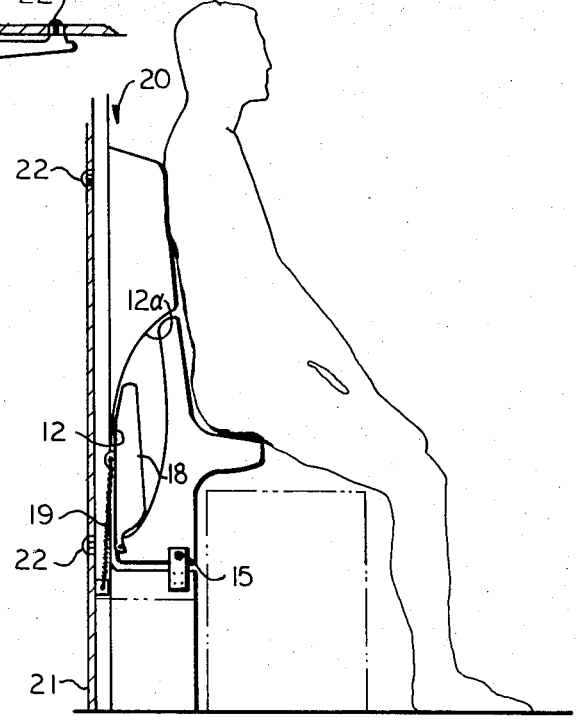
FIGS. 4 and 5 are somewhat diagrammatic views, in the nature of end elevational views, showing a single seat embodying the invention in use as, respectively, a semi-seat when the seat member is folded, and a full seat when it is swung downwardly, underseat areas available for the stowing of baggage with the seat being used by a passenger in each position being outlined in broken lines.
Figure 5:
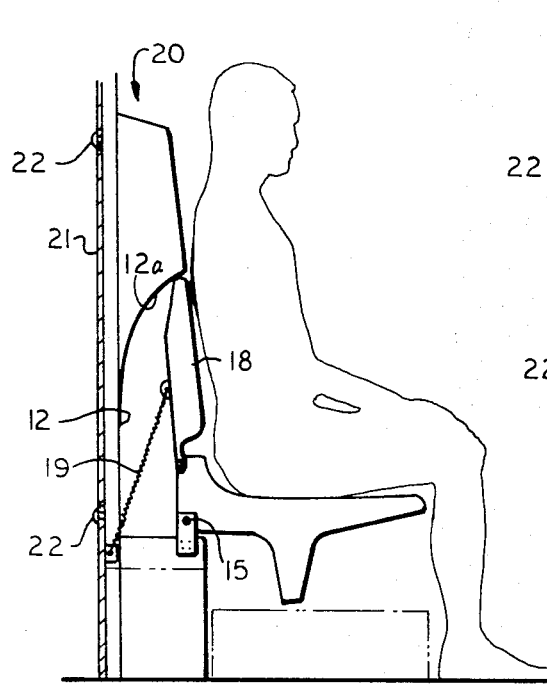

For providing a single end seat where required, as at each end of a passenger section of a vehicle, a single seat 20, which comprises essentially one half of the double seat 10, may be mounted against an end wall or bulkhead 21 as illustrated in FIGS. 4 and 5 in a manner which will be obvious to one having knowledge of the present invention and familiar with the design and manufacture of such seating facilities.

Figure 6:
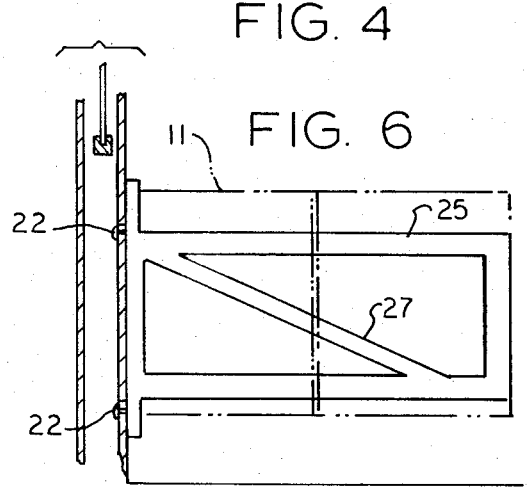
FIG. 6 is a diagrammatic view in the nature of a vertical transverse sectional view through a portion of a vehicle having the seats installed therein, and shows a preferred frame structure for a seat back member.

A preferred framing construction for the seat portion 11, particularly when the seats are cantilever mounted, is shown in FIG. 6, and comprises a flat, upright, rectangular frame 25 with integral diagonal support member 27.

Exposed portions of the seat structure, where single or double, which are contacted by a user thereof may be upholstered as desired, in a conventional manner, and the exposed end of each seat structure also may be covered by a suitable or conventional closure plate, not shown, such as those used on present vehicle seats of a generally comparable nature, as will be apparent to one familiar with the design and manufacture of such seating.

The invention provides a simple folding seat structure for use in transportation type vehicles, and one which not only provides comfortable full seating support when the seat member 14 is in down-swung position, but also provides a semi-seated support and additional avialable floor space when the seat member is in its upswung or folded position.

Having thus described my invention, what I claim as new and useful and desire to protect by U. S. Letters Patents is:

1. A folding seat for a transportation type vehicle comprising a generally upright back member, said back member comprising an upholstered, upper back supporting portion, and a recessed lower portion, a seat member hingedly mounted on the lower end of the back member for swinging movement about a horizontal axis between downswung position wherein the seat member extends at substantially right angles to the back member to provide a full seat, and upswung position wherein the free upper end of the seat member is seated in such recessed protion flush with the upper back portion, a projection shorter than the seat member extending substantially at right angles from the side of the seat member which is on the bottom thereof when the seat member is in its downswung, full seat position, and which is shaped to provide a semi-seat when the seat member is in its upswung position, and a lower back support member operatively connected to each seat member for movement in said recessed portion between a lowered, retracted position submerged within such recessed portion when the seat member is in its upswung position with its free end in flush seated position in the recessed portion, and a raised projected position substantially flush with the upper back supporting portion when the seat member is in its downswung, full seat position.

2. A folding seat as defined in claim 1 wherein a portion of the seat member is eccentric to its axis of pivotal movement, the lower back support member is hingedly connected to said eccentric portion to move the lower back support member slidably in such recess between its raised position closely adjacent the upper end of the recess with the seat member in its downswung, full seating position, and its lowered position, deeper within such recess, with the seat member is in upswung position.

3. A folding seat as defined in claim 2 wherein the portion of the seat back member defining the upper end portion of such recesses is curved, and forms a cam surface on which the upper end of the lower back support member rides and is moved thereby between its position substantially flush with the upper back portion above such recess with the seat member in its downswung position, and its position deeper within said recess with the seat member in its upswung, folded position.

4. A folding seat as claimed in claim 1 wherein the seat member covers and conceals the recess and the lower back support member mounted therein when said seat member is in its upswung, semiseat-froming position.

5. A folding seat as claimed in claim 1 wherein spring means acing between the lower back support member and a seat element biases the lower back support member toward the back member.

6. A folding seat as claimed in claim 5 wherein the spring means is mounted in biasing relation with the seat member and the lower back support member, and biases the lower back support member toward the back member and the seat member toward upswung, folded position.

7. A folding seat as claimed in claim 6 wherein the spring means is mounted in tension between a point on the recess side of each lower back support portion and a fixed seat back element at the lower end of such recess.

* * * * *